United States Patent [19]

Dard et al.

[11] Patent Number: 4,851,962

[45] Date of Patent: Jul. 25, 1989

[54] DEVICE FOR THE INDEXED FIXING OF A CONTROL UNIT

[75] Inventors: Pierre Dard, Le Peco; Fabrice Maës, Ermont, both of France

[73] Assignee: La Telemecanique Electrique, France

[21] Appl. No.: 144,975

[22] Filed: Jan. 19, 1988

[30] Foreign Application Priority Data

Sep. 30, 1987 [DE] Fed. Rep. of Germany ... 8713157[U]

[51] Int. Cl.⁴ .............................................. A02B 1/08
[52] U.S. Cl. ..................................... 361/334; 361/353
[58] Field of Search ..................... 361/334, 350, 353

[56] References Cited

U.S. PATENT DOCUMENTS 3,403,299 9/1968 Mrowka et al. .................... 361/353

Primary Examiner—Roy N. Envall, Jr.
Attorney, Agent, or Firm—William A. Drucker

[57] ABSTRACT

A device is provided for the indexed fixing of a control unit on a hat shaped section, wherein, at least one auxiliary adjustment device formed of a tenon and a cavity, is disposed between the hat shaped section and the control unit, the mechanical cooperation of the two making it possible to fix the control unit in the longitudinal axis of the hat shaped section.

9 Claims, 3 Drawing Sheets

DEVICE FOR THE INDEXED FIXING OF A CONTROL UNIT

BACKGROUND OF THE INVENTION

The invention relates to a device for the fixing the longitudinal position of a control unit on a hat shaped section, i.e. an elongated channel, U-shaped in cross-section.

It frequently happens that, for example, a series of control elements or members to be actuated are associated with switching and/or signalling apparatus control units actuated, for example, by control members disposed on the lid of a case. To ensure correct positioning of these control members situated on the lid of the case with respect to the control elements corresponding to the control unit, this latter must always be placed accurately in the case in question.

The invention aims at creating a device for the indexed fixing of a control unit on a hat shaped section ensuring, under all circumstances, accurate positioning of the control unit in the longitudinal axis of the hat shaped section, while keeping a simple structure and guaranteeing troublefree handling.

SUMMARY OF THE INVENTION

The invention achieves this objective by providing, in the region of the hat shaped section and the control unit, at least one auxiliary positioning device having a tenon corresponding to a mortice whose fitting together ensures that the control unit is fixed in the longitudinal axis of the hat shaped section.

This configuration ensures the exact positioning of the control unit, provided by indexation of the tenon and the mortice, on the hat shaped section. Thus, the control unit is accurately located with respect to the transverse and longitudinal axes of the hat shaped section.

The tenon or the mortice is advantageously provided on a separate piece which, in a variant, will have the shape of an angle iron, a first flange of which engages with the cross piece of the hat shaped section and a second flange of which engages with a flange of the hat shaped section; the second flange of the angle iron will have at least one cheek bent outwardly at right angles for forming a mortice or a tenon.

This separate piece is advantageously fixed by the first flange situated between the hat shaped section and the bottom of a case housing the control unit.

Snap fitting of the control unit on the hat shaped section forms a certain advantage. For this, it will be suitable to bend the two flanges of the hat shaped section outwardly on the side closest to the control unit. On the bottom of the control unit a middle section, as least partially resilient may also be provided snap fitting onto the hat shaped section, this middle section preferably including projections inserted under the outwardly bent edges of the two flanges of the hat shaped section. To facilitate snap fitting, these projections should be bevelled.

With the auxiliary adjusting device including a tenon and a mortice, the control unit can only snap fit onto the hat shaped section in the position provided on the longitudinal axis of this same section.

Other advantageous variants of the invention will be clear from the subsidiary claims.

BRIEF DESCRIPTION OF THE DRAWINGS

The invention is explained hereafter in one embodiment with reference to the drawings in which.

DESCRIPTION OF THE PREFERRED EMBODIMENT

Figure 1:
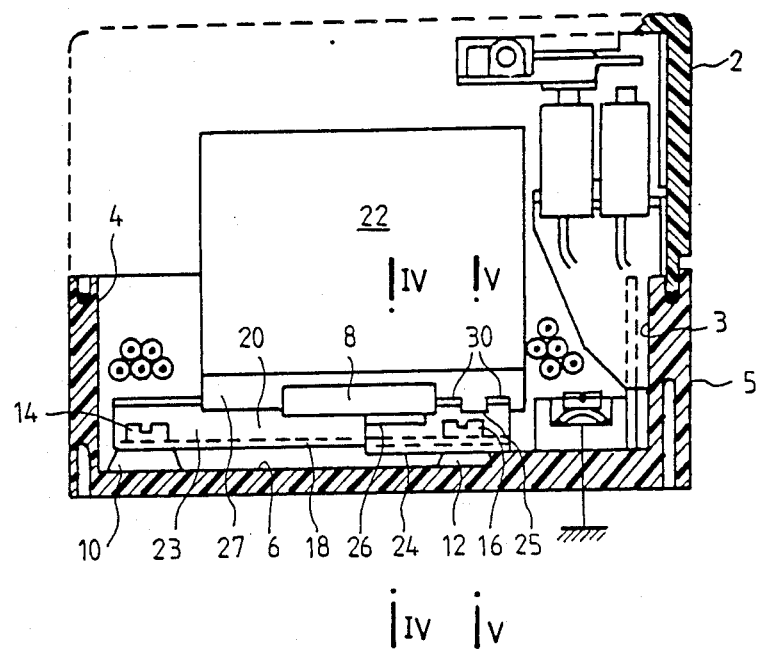
FIG. 1 shows a control unit housed in a case, which unit is fixed by the device of the invention on the hat shaped section.
Figure 2:
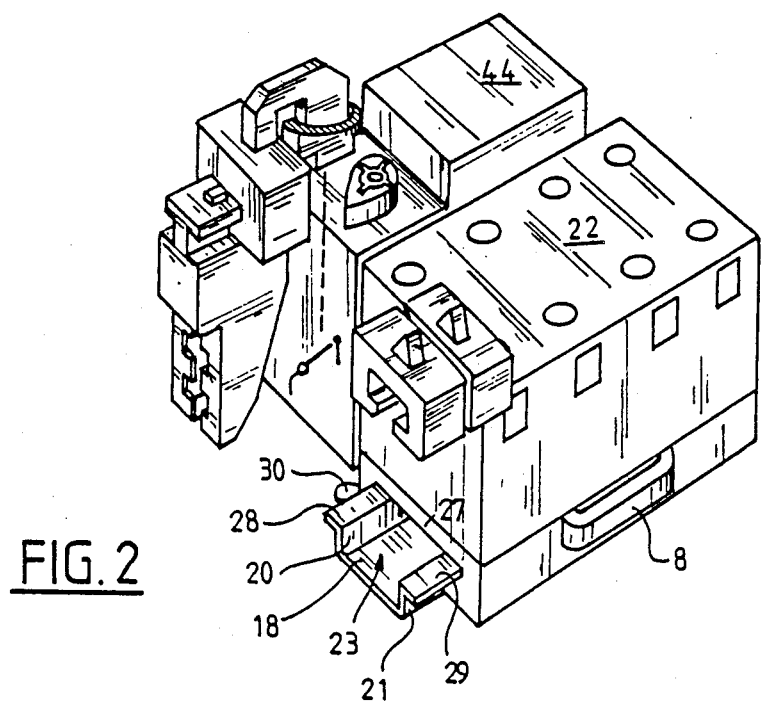
FIG. 2 shows the control unit out of the case, but already snap-fitted onto the hat shaped profile.
Figure 4:
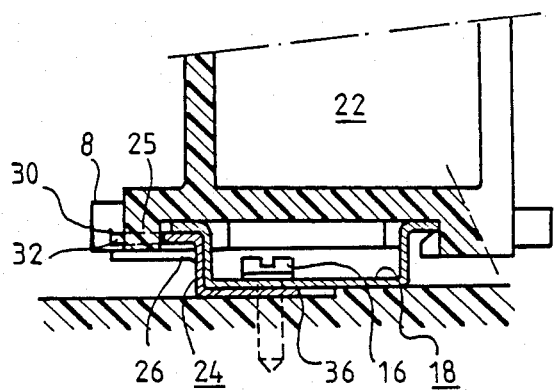
FIG. 4 is a cross-sectional view along line IV—IV of FIG. 1.
Figure 5:
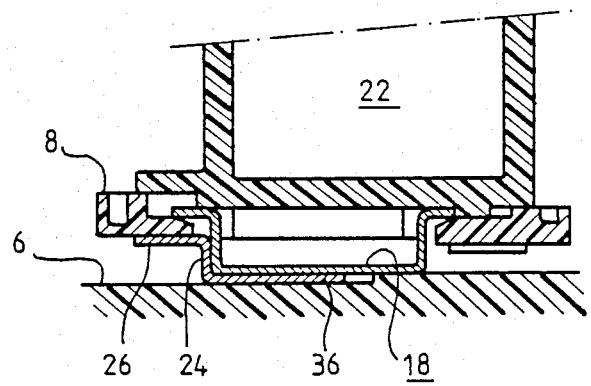
FIG. 5 is a cross-sectional view along line V—V of FIG. 1.

FIG. 1 shows the section of a case 2, 5 of a switching and/or signalling apparatus in which is housed a control unit consisting of a contactor 22 and a thermorelay 44 (cf. FIG. 2). This case (2, 5) includes a base part 5 and a lid 2.

As is clear from FIG. 2, the thermorelay is positioned laterally with respect to the contactor 22. This being the case, this latter is snap fitted onto the hat shaped section 23 (i.e., an elongated channel, U-shaped in cross section) which, in its turn, is fixed on the bottom 6 of base 5 (cf. FIG. 1).

The hat shaped section 23 rests by its cross piece 18 on two base elements 10, 12 disposed on the bottom 6 of base 5 and connected together by two screws 14, 16.

Figure 3:
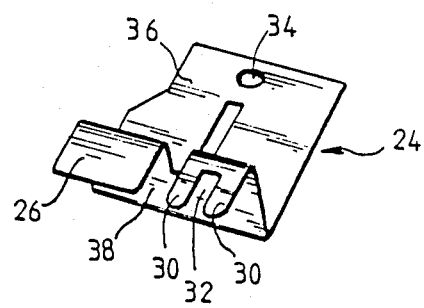
FIG. 3 shows a morticed angle iron which, with a tenon provided on the control unit, forms an auxiliary adjusting means for this control unit.

For fixing the control unit 22, 44 in the longitudinal axis of the hat shaped profile 23, the lower edge of the contactor 22 includes a tenon 25 which cooperates mechanically with the mortice 32 provided in an angle iron 24 to be fixed on the hat shaped section (cf. also FIG. 3).

As is clear from FIG. 1, the hat shaped section 23 receiving the control unit 22, 44 extends between the two side walls 3, 4 of base 5.

The separate angle iron 24 has a first flange 36 placed between the bottom 6 of base 5 and the cross piece 18 of hat shaped section 23 and engaging with said cross piece 18. A second flange 38 of the angle iron 24 is fixed to one of the flanges (cf. FIG. 2) of the hat shaped section 23.

From the flange 38 of angle iron 24 two rather narrow cheeks 30 project at right angles outwardly, between which is formed the mortice 32 cooperating mechanically with the tenon 25.

The second flange 38 of the separate angle iron 24 further includes a fairly wide cheek 26, also bent at right angles outwardly and by which the separate angle iron 24 bears on the lower edge of the contactor 22 of the control unit 22, 44.

The tenon 25 cooperating with the mortice 32 of the angle iron 24 is provided on the downwardly bent base of the control unit. This base, which houses tenon 25, may advantageously also be bent back outwardly.

The fairly wide cheek 26 rests on this base of the control unit 22, 44 or of the contactor 22 thereof, to the extent that the tenon 25 is completely inserted in the mortice 32 which is intended for it.

In this case, the distance from the wide cheek 26 to the flange 36 of the angle iron 24 is smaller than that from the other two cheeks 30 forming mortice 32 to the same flange 36.

Flange 36 of angle iron 24 is disposed between the cross piece 18 of the hat shaped section 23 and the bottom 6 of base 5, or base 12 provided on the bottom. Screw 16 passes on one side through a hole formed in the cross piece 18 of the hat shaped section 23 and on the other through an opening 34 in the flange 36 of the angle iron 24 provided for this purpose. Consequently, this flange 36 is inserted between the hat shaped section 23 and the bottom 6 of the base 5 of case 2, 5 for fixing the angle iron 24 in this position.

The control unit 22, 44 or the contactor 22 of this unit is snap fitted onto the hat shaped section 23. For this, the two flanges 20, 21 of hat shaped section 23 are bent outwardly at the edge the closest to contactor 22. On the bottom of this contactor 22 is implanted a middle section 8 which cooperates with the hat shaped section 23, this middle section being at least partially resilient. This resilient middle section 8 has projections which are inserted under the outwardly bent edges of the two flanges 20, 21 of the hat shaped profile 23. These two edges of flanges 20, 21 form two rims 28, 29 applied against a part 27 of the bottom of contactor 22.

To facilitate snap fitting of contactor 22 on the hat shaped section, the two projections inserted under rims 28, 29 of the resilient middle section 8 have been bevelled.

What is claimed is:

1. A control device comprising, housed in a case having an inner bottom surface:
   i. an elongated channel, U-shaped in cross-section secured at both ends to said bottom surface;
   ii. a control unit having a substantially plane base surface portion and a recessed surface portion shaped for snapfitting engagement with said elongated channel; and
   iii. means for fixing the position of said control unit along said elongated channel,
wherein said means essentially consist of an angle iron and a shaped portion which cooperates with a further shaped portion which cooperates with a further shaped portion of said recessed surface portion, said angle iron being inserted between said elongated channel and an inner bottom surface.

2. A control device as claimed in claim 1, wherein said shaped portion is a mortice and said further shaped portion is a tenon.

3. The device as claimed in claim 2, wherein the two flanges of the elongated channel are, at their edge contiguous with the control unit, bent back outwardly.

4. The device as claimed in claim 2, wherein a middle section at least partially resilient is disposed on the bottom of the control unit, this section engaging with the elongated channel.

5. A control device as claimed in claim 2, wherein said angle iron has a first flange which is engaged with the cross piece of the elongated channel, a second flange which is engaged with a flange of the elongated channel and at least one cheek extending from said second flange and bent at right angles outwardly so as to form the mortice.

6. The device as claimed in claim 4, wherein said middle section has projections which are inserted under the outwardly bent edges of the two flanges of the elongated channel.

7. The device as claimed in claim 5, wherein said second flange of said angle iron has two cheeks bent outwardly at right angles, a mortice being formed by the gap between these two cheeks.

8. The device as claimed in claim 5, wherein said second flange of said angle iron includes an additional cheek by which said angle iron bears on the lower edge of the control unit.

9. The device as claimed in claim 8, wherein said additional cheek rests on the bent back edge of the control unit and the distance from this cheek to said first flange is shorter than that from the outer two flanges forming the mortice to this same flange.

* * * * *